(12) United States Patent
You et al.

(10) Patent No.: US 12,380,541 B2
(45) Date of Patent: Aug. 5, 2025

(54) METHOD AND APPARATUS FOR TRAINING IMAGE RESTORATION MODEL, ELECTRONIC DEVICE, AND COMPUTER-READABLE STORAGE MEDIUM

(71) Applicant: SANECHIPS TECHNOLOGY CO., LTD., Guangdong (CN)

(72) Inventors: Jing You, Guangdong (CN); Hengqi Liu, Guangdong (CN); Ke Xu, Guangdong (CN); Dehui Kong, Guangdong (CN); Jisong Ai, Guangdong (CN); Xin Liu, Guangdong (CN); Cong Ren, Guangdong (CN)

(73) Assignee: SANECHIPS TECHNOLOGY CO., LTD., Guangdong (CN)

( * ) Notice: Subject to any disclaimer, the term of this patent is extended or adjusted under 35 U.S.C. 154(b) by 385 days.

(21) Appl. No.: 17/924,158

(22) PCT Filed: May 6, 2021

(86) PCT No.: PCT/CN2021/091854
§ 371 (c)(1),
(2) Date: Nov. 9, 2022

(87) PCT Pub. No.: WO2021/227915
PCT Pub. Date: Nov. 18, 2021

(65) Prior Publication Data
US 2023/0177650 A1 Jun. 8, 2023

(30) Foreign Application Priority Data
May 9, 2020 (CN) .......................... 202010388892.2

(51) Int. Cl.
*G06T 5/00* (2024.01)
*G06T 3/40* (2006.01)
(Continued)

(52) U.S. Cl.
CPC .................. *G06T 5/73* (2024.01); *G06T 3/40* (2013.01); *G06T 5/60* (2024.01); *G06T 2207/20081* (2013.01); *G06T 2207/20084* (2013.01)

(58) Field of Classification Search
CPC ... G06T 5/00; G06T 3/40; G06T 2207/20081; G06T 2207/20084; G06T 5/73;
(Continued)

(56) References Cited

U.S. PATENT DOCUMENTS

| 2011/0228848 A1* | 9/2011 | Dvir | H04N 19/107 |
| | | | 375/E7.076 |
| 2018/0293453 A1* | 10/2018 | Viswanathan | G06V 10/40 |

(Continued)

FOREIGN PATENT DOCUMENTS

| CN | 110163815 A | * | 8/2019 | ........... G06N 3/0454 |
| CN | 111047532 A | * | 4/2020 | |
| CN | 111127346 A | * | 5/2020 | ........... G06N 3/0454 |

OTHER PUBLICATIONS

WIPO, International Search Report issued on Aug. 11, 2021.

*Primary Examiner* — Henok Shiferaw
*Assistant Examiner* — Woo C Rhim
(74) *Attorney, Agent, or Firm* — Li & Cai Intellectual Property (USA) Office (57) ABSTRACT

Disclosed are a method and apparatus for training an image restoration model, an electronic device, and a computer-readable storage medium. The method for training an image restoration model includes: pre-processing training images to obtain a low-illumination image sample set (110); determining, based on low-illumination image samples in the low-illumination image sample set and the image restoration model, a weight coefficient of the image restoration model (120), wherein the image restoration model is a neural network model determined on a U-Net network and a deep
(Continued)

residual network; and adjusting the image restoration model according to the weight coefficient, and further training the adjusted image restoration model using the low-illumination image samples until the image restoration model restores parameters of all the low-illumination image samples in the low-illumination image sample set into a preset range (130).

17 Claims, 7 Drawing Sheets

(51) Int. Cl.
*G06T 5/60* (2024.01)
*G06T 5/73* (2024.01)

(58) Field of Classification Search
CPC ........... G06T 5/60; G06T 5/94; G06N 3/0455; G06N 3/0464; G06N 3/088
See application file for complete search history.

(56) References Cited

U.S. PATENT DOCUMENTS

| | | | |
|---|---|---|---|
| 2019/0043178 A1* | 2/2019 | Chen | G06T 5/40 |
| 2019/0384963 A1* | 12/2019 | Kim | G06V 20/698 |
| 2021/0110522 A1* | 4/2021 | Ren | G06T 3/40 |
| 2021/0150268 A1* | 5/2021 | Wang | G06N 3/045 |
| 2021/0166345 A1* | 6/2021 | Kim | G06T 3/4053 |
| 2021/0374381 A1* | 12/2021 | Ozcan | G03H 1/0005 |
| 2022/0084166 A1* | 3/2022 | Navarrete Michelini | G06N 3/048 |
| 2022/0108452 A1* | 4/2022 | Xiang | G06T 7/11 |
| 2022/0207680 A1* | 6/2022 | Wang | G06T 5/73 |
| 2022/0301114 A1* | 9/2022 | Marras | G06T 5/70 |
| 2023/0177650 A1* | 6/2023 | You | G06N 3/0464 382/100 |

* cited by examiner

METHOD AND APPARATUS FOR TRAINING IMAGE RESTORATION MODEL, ELECTRONIC DEVICE, AND COMPUTER-READABLE STORAGE MEDIUM

TECHNICAL FIELD

Embodiments of the present application relate to the technical field of video monitoring.

BACKGROUND

A video monitoring system can automatically identify and store the monitored images, and transmit the monitored images back to a control host through different types of communication networks, so that the control host can perform real-time watching, recording, playback, callout, or other operations on the images, thereby implementing video monitoring of the mobile Internet.

SUMMARY

In one aspect, an embodiment of the present application provides a method for training an image restoration model, including: pre-processing training images to obtain a low-illumination image sample set; determining, based on low-illumination image samples in the low-illumination image sample set and the image restoration model, a weight coefficient of the image restoration model, where the image restoration model is a neural network model determined from a U-Net network and a deep residual network; and adjusting the image restoration model according to the weight coefficient, and further training the adjusted image restoration model using the low-illumination image samples until the image restoration model restores parameters of all the low-illumination image samples in the low-illumination image sample set into a preset range.

In another aspect, an embodiment of the present application provides an apparatus for training an image restoration model, including: a pre-processing module configured to pre-process training images to obtain a low-illumination image sample set; a weight coefficient determination module configured to determine, based on low-illumination image samples in the low-illumination image sample set and the image restoration model, a weight coefficient of the image restoration model, where the image restoration model is a neural network model determined from a U-Net network and a deep residual network; and a training adjustment module configured to adjust the image restoration model according to the weight coefficient, and further train the adjusted image restoration model using the low-illumination image samples until the image restoration model restores parameters of all the low-illumination image samples in the low-illumination image sample set into a preset range.

In yet another aspect, an embodiment of the present application provides an electronic device, including: one or more processors; a storage device having one or more programs stored thereon which, when executed by the one or more processors, cause the one or more processors to implement the method for training an image restoration model described in any embodiment of the present application.

In still another aspect, an embodiment of the present application provides a computer-readable storage medium having a computer program stored thereon which, when executed by a processor, causes the method for training an image restoration model described in any embodiment of the present application to be implemented.

DETAIL DESCRIPTION OF EMBODIMENTS

In order to make those skilled in the art better understand the technical solutions of the present application, the following describes the method and apparatus for training an image restoration model, the electronic device, and the computer-readable medium of present application in detail with reference to the accompany drawings.

Example embodiments will be described more sufficiently below with reference to the accompanying drawings, but which may be embodied in different forms and should not be construed as limited to the embodiments set forth herein. Rather, these embodiments are provided so that the present application will be thorough and complete, and will fully convey the scope of the present application to those skilled in the art.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the existing art and the present application, and will not be interpreted in an idealized or overly formal sense unless expressly so defined herein.

A video monitoring system can transmit the monitored images back to a control host, so that the control host can perform watching, recording, playback, callout, or other operations on the images, thereby implementing video monitoring of the mobile Internet. However, the quality of the obtained image differs greatly due to influences of the ambient light. With sufficient illumination, clear image data with a high color rendition can be provided; but at low illumination, the quality of the obtained images is greatly reduced, because images captured by a camera in an under-exposed environment are not clear, which will severely influence the monitoring effect by a user.

Currently, manufacturers have proposed different solutions to this problem, including, for example, upgrading hardware configuration or adding a supplement light source, but these solutions involve increased hardware cost. In the current implementation adopting software, one aspect of brightness or color or the like is mainly intended to be improved, such as enhancing the brightness of a low-illumination image or restoring the color of a low-illumination image, but the problems of low brightness, low contrast, detail loss, color distortion and the like of the low-illumination images in the monitoring scenario are not fully considered, making it hard to obtain optimal video monitoring images at low illumination, and even leading to failure of the monitoring, from which no useful information cannot be obtained.

Figure 1:
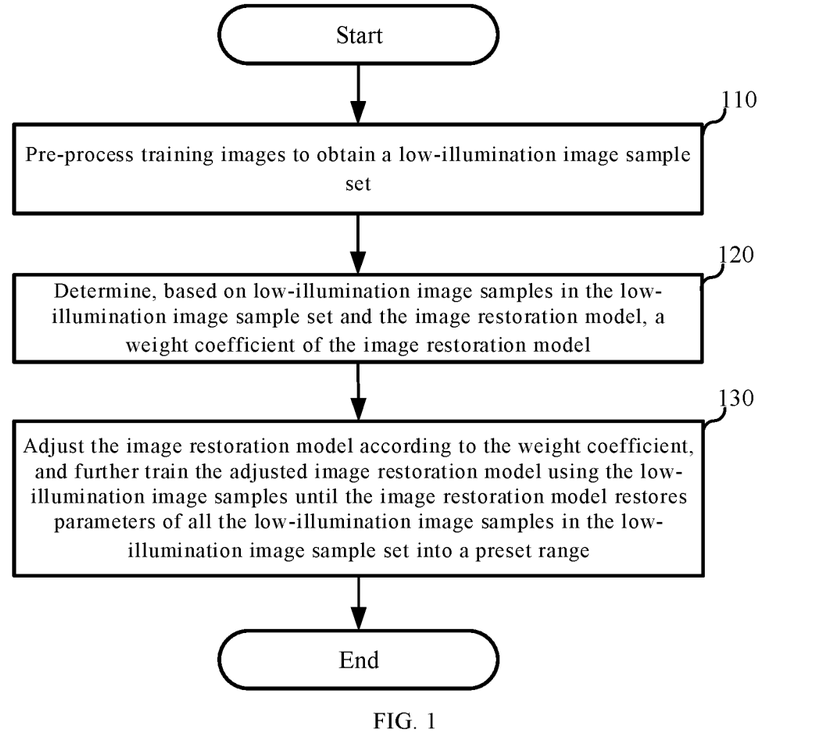
FIG. 1 is a schematic flowchart of a method for training an image restoration model according to an embodiment of the present application.

FIG. 1 shows a schematic flowchart of a method for training an image restoration model according to an embodiment of the present application. The method for training the image restoration model may be applied to an apparatus for training an image restoration model. As shown in FIG. 1, the method for training the image restoration model may include the following operations 110 to 130.

At operation 110, pre-processing training images to obtain a low-illumination image sample set.

Low-illumination image samples in the low-illumination image sample set may be image samples obtained when a detected illumination is less than a preset illumination threshold.

For example, when the camera captures images at night, the ambient environment provides a low illumination due to lack of sun light. If the detected illumination is less than a preset illumination threshold (e.g., 10 lux), the captured images at this time may be considered to be low-illumination images. The training images captured by the camera may include the low-illumination images and preset reference images. By pre-processing the training images, a low-illumination image sample set and a preset reference image sample set can be obtained. The reference image samples in the preset reference image sample set are image samples obtained when the detected illumination is greater than or equal to the preset illumination threshold.

A color mode of the training images is an RGB mode. It should be noted that other color modes are also possible, but the RGB mode adopted in the present application is more desirable. The color mode may be specifically set according to the actual situation, the color mode herein is merely illustrative, and other color modes not mentioned herein also fall within the protection scope of the present application, which are not described in detail here.

In some possible implementations, operation 110 may include: normalizing the training images to obtain normalized image data; sampling in row and column directions of the normalized image data in an alternative manner, respectively, to obtain M pieces of dimensional data, where M is an integer greater than or equal to 1; and performing data augmentation on each piece of dimensional data to obtain the low-illumination image sample set and a preset reference image sample set.

In some possible implementations, three-channel images (for example, RGB images, i.e., R-channel images, G-channel images, and B-channel images) captured by the camera may be first normalized, so that a spatial range of the images is reduced (for example, reduced to the range of [0, 1]), to obtain the normalized image data.

Figure 2:
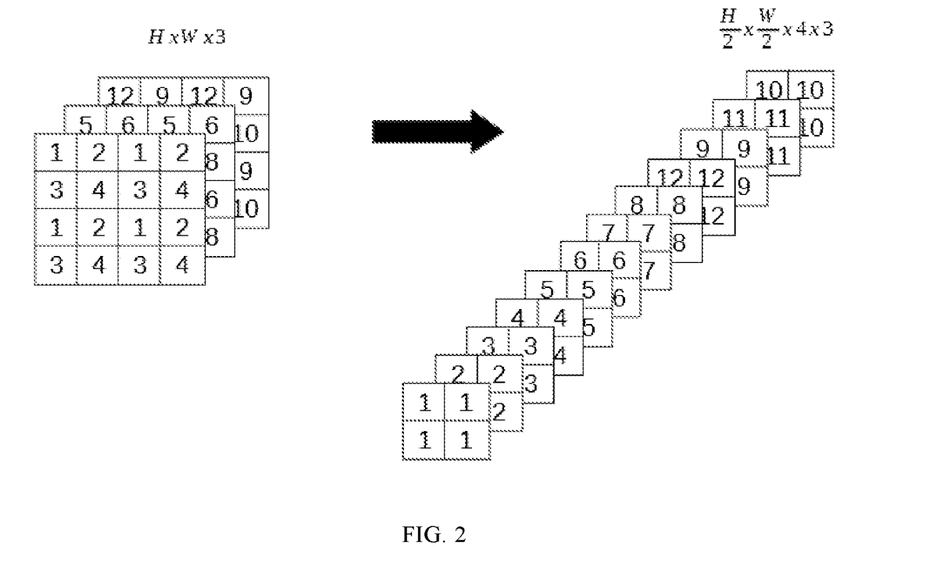
FIG. 2 is a schematic diagram showing data reorganization of normalized image data according to an embodiment of the present application.

Then, the normalized image data in each channel is subjected to data reorganization. FIG. 2 is a schematic diagram showing data reorganization of the normalized image data according to an embodiment of the present application. As shown in FIG. 2, the image in each channel is subjected to dimensionality reduction, that is, for the image in each channel, sampling is performed in the row and column directions in an alternative manner, so that each pixel is ensured to be sampled. In FIG. 2, the image in each channel is subjected to ½ down-sampling for 4 times, and the image data in each channel is processed into data $$\frac{H}{2} * \frac{W}{2} * 4,$$

where H represents an original height of the image, and W represents an original width of the image. Therefore, the three-channel image is processed into data $$\frac{H}{2} * \frac{W}{2} * 4 * 3,$$

and, without losing image information, a spatial resolution of the image is reduced and spatial information is transferred to other different dimensions for processing, thereby realizing lossless down-sampling of the image data. In this manner, the computational complexity of subsequent networks can be effectively reduced.

Finally, the image data is randomly divided into blocks of a certain size, and data augmentation (for example, random data turning or rotation or other operations) is performed on each dimensional data of each image block, to obtain the low-illumination image sample set and the preset reference image sample set, and improve richness of the data.

At operation 120, determining, based on low-illumination image samples in the low-illumination image sample set and the image restoration model, a weight coefficient of the image restoration model.

It should be noted that the image restoration model is a neural network model determined from a U-Net network and a deep residual network (ResNet). In some possible implementations, a first neural network model determined from the U-Net network and a second neural network model determined from the ResNet network may be cascaded to implement functionality of the image restoration model; and the image restoration model may also be embodied in other different forms based on functions of the U-Net network and the ResNet. The specific implementation of the image restoration model describe above is merely illustrative, and may be specifically set based on the specific implementation, and, other specific implementations of the image restoration model not mentioned herein also fall within the protection scope of the present application, which will not be described in detail here.

At operation 130, adjusting the image restoration model according to the weight coefficient, and further training the adjusted image restoration model using the low-illumination image samples until the image restoration model restores parameters of all the low-illumination image samples in the low-illumination image sample set into a preset range.

In some possible implementations, the image restoration model (for example, a relevant parameter in the image restoration mode or the like) is adjusted according to a weight coefficient obtained for a first time to obtain the adjusted image restoration model, so that when a low-illumination image is restored with the image restoration model, a restored image sample closer to the normal image can be obtained. Then, low-illumination image samples are further input into the adjusted image restoration model for training, to obtain a second weight coefficient corresponding to the adjusted image restoration model, and then, the adjusted image restoration model is further adjusted with the second weight coefficient. These operations are repeated for multiple times until the image restoration model restores parameters of all the low-illumination image samples in the low-illumination image sample set into a preset range. After many times of training and adjustment, the finally resulted image restoration model can meet the restoration requirement of the low-illumination image sample. In other words, when a low-illumination image sample is input into the finally resulted image restoration model, an image sample of high contrast, low noise, rich details, high color rendition and normal brightness can be obtained.

In some possible implementations, a plurality of verification sample sets may be used to verify each adjusted image restoration model and obtain a plurality of verification results accumulatively. Next, according to an adjustment trend of the plurality of verification results, it is determined whether the current adjustment to the image restoration model according to the weight coefficient is suitable, and the image restoration model is fine-tuned in detail to make it closer to the image restoration model that is desired to be obtained finally. Each verification sample set includes a plurality of verification image samples.

According to the method for training an image restoration model described in any embodiment of the present application, based on low-illumination image samples in the low-illumination image sample set and the image restoration model, the weight coefficient of the image restoration model can be determined and continuously adjusted, and finally an image restoration model capable of restoring all the low-illumination image samples in the low-illumination image sample set to the preset image samples can be obtained, where the image restoration model is a neural network model determined from a U-Net network and a deep residual network. Therefore, the influence of ambient light on video monitoring imaging can be reduced, the obtained low-illumination image can be improved and restored to obtain a normal image sample, thereby preventing the problem of image unsharpness and improving the user experience. In addition, no additional hardware equipment is desired, and the hardware cost is reduced.

Figure 3:
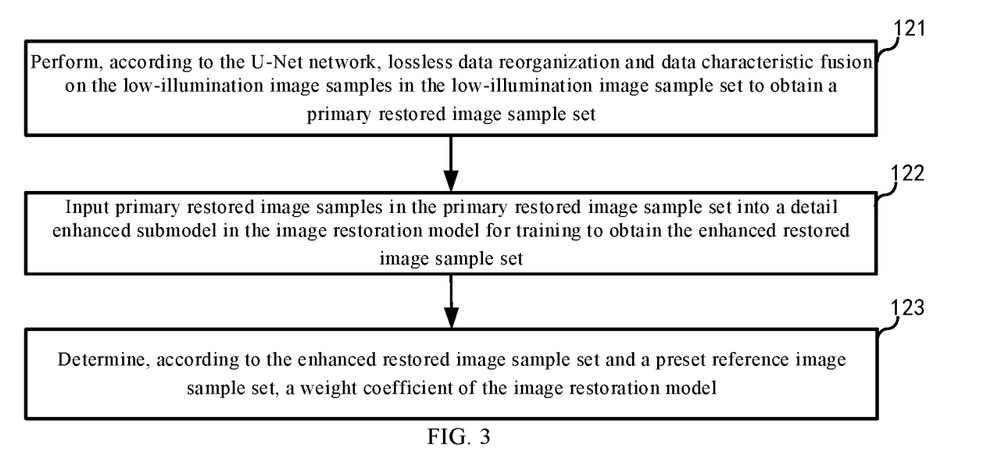
FIG. 3 is a flowchart of a method for determining a weight coefficient of the image restoration model according to an embodiment of the present application.

FIG. 3 shows a flowchart of a method for determining a weight coefficient of an image restoration model according to an embodiment of the present application. Operation 120, which may be implemented in the method shown in FIG. 3, may specifically include operations 121 to 123.

At operation 121, performing, according to the U-Net network, lossless data reorganization and data characteristic fusion on the low-illumination image samples in the low-illumination image sample set to obtain a primary restored image sample set.

In some possible implementations, each low-illumination image samples in the low-illumination image sample set is subjected to the operations of: firstly, performing lossless data reorganization on the low-illumination image sample (for example, firstly performing lossless down-sampling on the image data, or the like), then combining down-sampling results of different levels and corresponding data characteristics, performing data characteristic fusion on the down-sampled data and data subjected to deconvolution, and finally performing lossless up-sampling on the fused data to obtain primary restored image samples, where the resulted primary restored image samples after the above processing form a primary restored image sample set.

Figure 4:
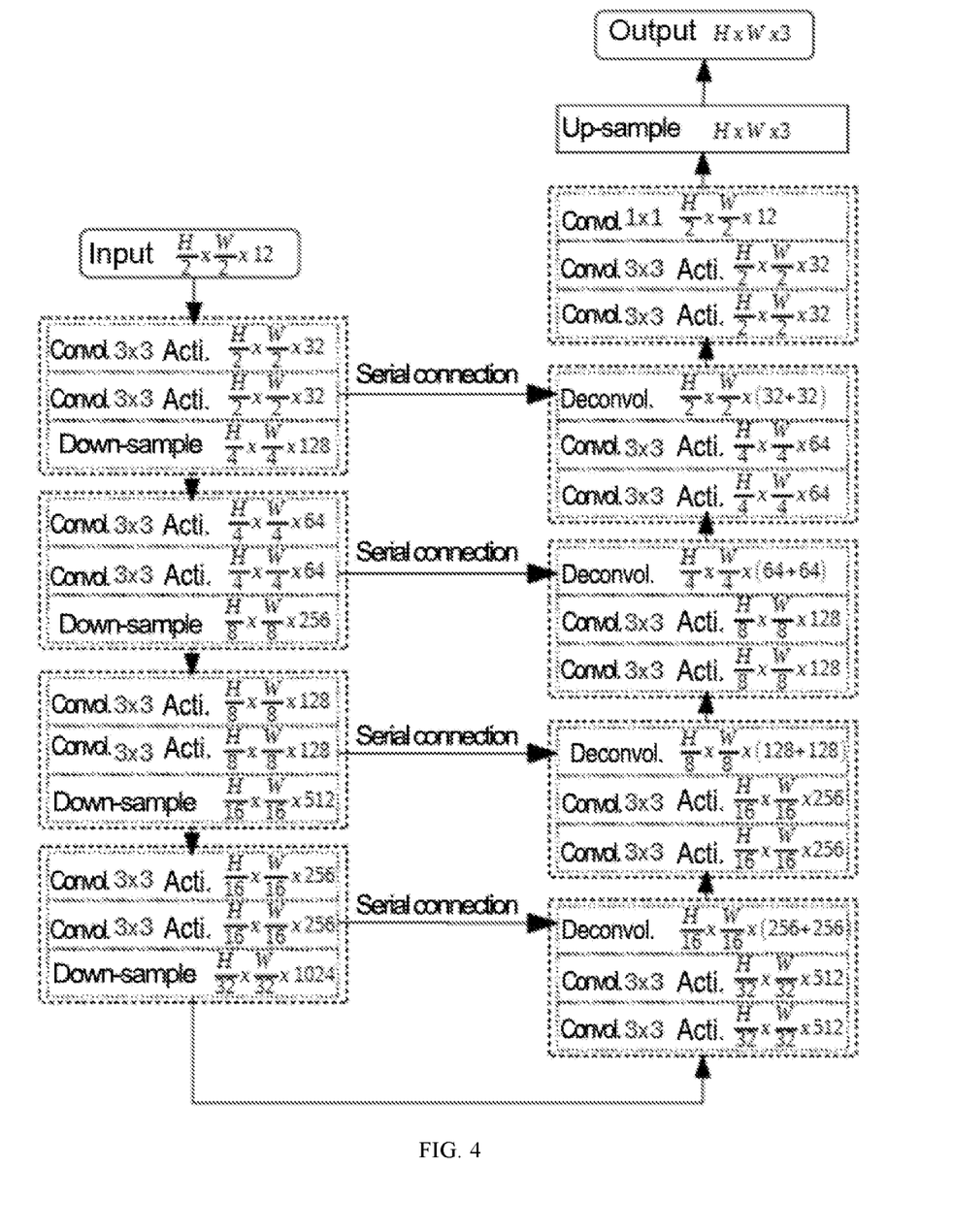
FIG. 4 is a flowchart of a method for training an image restoration sub-network constructed from a U-Net network according to an embodiment of the present application.

For example, FIG. 4 is a flowchart of a method for training an image restoration sub-network constructed from a U-Net network according to an embodiment of the present application. As shown in FIG. 4, the method includes an encoding process and a decoding process for image samples. The left side of FIG. 4 shows the encoding process, where the data $$\frac{H}{2} * \frac{W}{2} * 4 * 3$$

obtained from the pre-processing in operation 110 is input into an image restoration sub-network constructed from the U-Net network for first layer down-sampling and data reorganization. For example, the data $$\frac{H}{2} * \frac{W}{2} * 4 * 3$$

is subjected to 3*3 convolution and activated, obtaining data $$\frac{H}{2} * \frac{W}{2} * 32.$$

Then, the data $$\frac{H}{2} * \frac{W}{2} * 32$$

is subjected to lossless down-sampling, obtaining data $$\frac{H}{4} * \frac{W}{4} * 128,$$

as well as data characteristics corresponding to the first layer down-sampling. Data obtained after the first layer down-sampling are subjected to second-layer down-sampling and data reorganization, where the sampling process is similar to that of the first-layer down-sampling, i.e., lossless down-sampling. Down-sampling is further performed in sequence, and 4 times of lossless down-sampling are performed in total, through which the initially input data $$\frac{H}{2} * \frac{W}{2} * 4 * 3$$

is sampled to data $$\frac{H}{32} * \frac{W}{32} * 1024.$$

Symmetrically, the right side of FIG. 4 shows the decoding process for encoded data. In some possible implementations, the down-sampled data $$\frac{H}{32} * \frac{W}{32} * 1024$$

is decoded, and, corresponding to the different layers of down-sampling shown on the left, subjected to 4 times of deconvolution up-sampling sequentially from bottom to top. Meanwhile, high-level data characteristics obtained after the deconvolution is connected in series with low-level data characteristics of a same segment of encoded part to realize fusion of the data characteristics under different scales, thereby realizing image enhancement. For example, the first up-sampling process includes: performing 3*3 convolution twice on data $$\frac{H}{32} * \frac{W}{32} * 1024,$$

and activating to obtain data $$\frac{H}{32} * \frac{W}{32} * 512,$$

which is then subjected to deconvolution to obtain data $$\frac{H}{16} * \frac{W}{16} * 256,$$

and connected in series with low-level characteristics of a same segment of encoded part to obtain data $$\frac{H}{16} * \frac{W}{16} * (256 + 256).$$

In this manner, 4 times of deconvolution up-sampling and serial connection are performed sequentially from bottom to top to obtain the restored image data H*W*3, and finally, the lossless up-sampling and data reorganization is performed again to obtain primary restored image samples.

In the image restoration sub-network constructed from the U-Net network, the up-sampling and down-sampling of image data are implemented through data reorganization, and spatial data blocks in space and dimensional data are mutually mapped.

Figure 5:
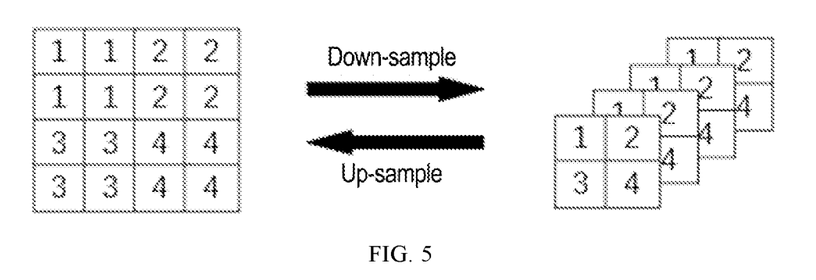
FIG. 5 is an exemplary flowchart illustrating up-sampling and down-sampling of images according to an embodiment of the present application.

FIG. 5 is an exemplary flowchart illustrating up-sampling and down-sampling of images according to an embodiment of the present application. As shown in FIG. 5, the left spatial data blocks are down-sampled to obtain the corresponding data in different dimensions on the right, and the data up-sampling is carried out symmetrically. For example, a library function Depth_To_Space of the neural network may be used to implement the up-sampling in FIG. 5, and a library function Space_To_Depth may be used to implement the down-sampling in FIG. 5, so that no information is lost during the data up-sampling and down-sampling, and the precision of data restoration is improved.

At operation 122, inputting primary restored image samples in the primary restored image sample set into a detail enhanced submodel in the image restoration model for training to obtain the enhanced restored image sample set.

The detail enhanced submodel may be a neural network model determined from the deep residual network.

At operation 123, determining, according to the enhanced restored image sample set and a preset reference image sample set, a weight coefficient of the image restoration model.

It should be noted that the preset reference image sample set may include preset reference image samples, which may be image samples obtained when the illumination is greater than or equal to the preset illumination threshold. The obtained enhanced restored image samples are compared with preset reference image samples to determine whether the obtained enhanced restored image samples are improved compared with the original low-illumination image samples, and further determine a weight coefficient of the image restoration model to ensure that the image restoration model has a training trend towards a convergence direction.

In this implementation, by performing, according to the U-Net network, lossless data reorganization and data characteristic fusion on the low-illumination image samples in the low-illumination image sample set, the low-illumination image samples can be primarily processed to obtain a primary restored image sample set; then, primary restored image samples in the primary restored image sample set are input into a detail enhanced submodel in the image restoration model for training, where lossless up-sampling and down-sampling operations are adopted to obtain an enhanced restored image sample set and ensure that no data information is lost; and according to the enhanced restored image sample set and a preset reference image sample set, a weight coefficient of the image restoration model is determined, and the image restoration model is adjusted by adjusting the weight coefficient, so that the adjusted image restoration model can better satisfy the requirement, i.e., a restored image sample closer to the normal image can be obtained.

In some possible implementations, operation 122 can be implemented as follows, which may specifically include: performing lossless down-sampling and data reorganization on the primary restored image samples to obtain a primary detail enhanced training sample set; processing, according to the deep residual network, primary detail enhanced training samples in the primary detail enhanced training sample set to obtain a residual sample set; and performing up-sampling and data reorganization on residual samples in the residual sample set to obtain the enhanced restored image sample set.

Figure 6:
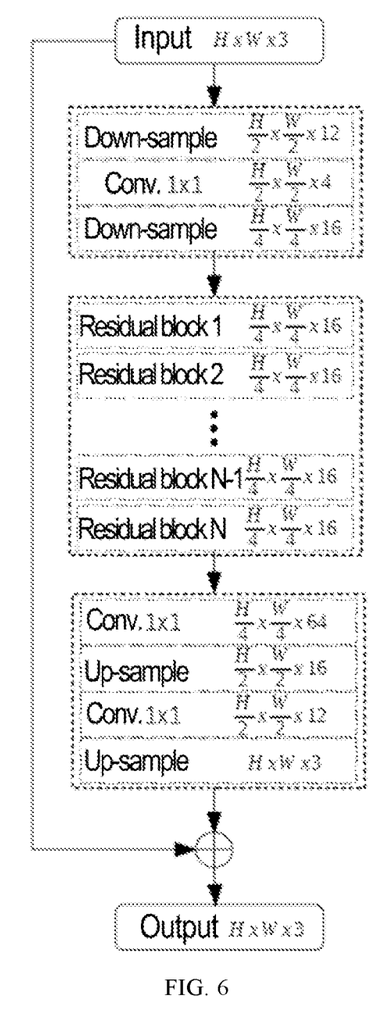
FIG. 6 is a schematic flowchart of a specific implementation of a deep residual network according to an embodiment of the present application.

For example, FIG. 6 shows a schematic flowchart of a specific implementation of a deep residual network according to an embodiment of the present application. As shown in FIG. 6, a primary restored image sample (e.g., data H*W*3) is input into a detail enhanced submodel constructed from the ResNet, and firstly subjected to down-sampling twice (e.g., the down-sampling shown in FIG. 5) and data reorganization. For example, the data H*W*3 is subjected to the down-sampling as shown in FIG. 5 once, and then the down-sampled result (i.e., data $$\frac{H}{2} * \frac{W}{2} * 12)$$

is subjected to 1*1 convolution to obtain the convolution result (i.e., data $$\frac{H}{2} * \frac{W}{2} * 4),$$

and then the convolution result is further subjected to the down-sampling shown in FIG. 5 to obtain data $$\frac{H}{4} * \frac{W}{4} * 16.$$

At this time, after 4 times of lossless down-sampling and data reorganization, the input primary restored image sample is reduced to $$\left(\frac{H}{4}, \frac{W}{4}\right)$$

in resolution. By reducing the resolution of the primary restored image sample, the complexity of the data is reduced to facilitate subsequent data processing.

Then, data $$\frac{H}{4} * \frac{W}{4} * 16$$

is input into N residual blocks for processing (for example, into 14 cascaded residual blocks for processing to obtain a deeper residual network model), where n is an integer greater than or equal to 1. The operation result of each residual block is subjected to 1*1 convolution and up-sampling twice, to restore the image to the original resolution (namely, to obtain new data H*W*3), and finally, the primary restored image sample is combined with the data (namely, the new data H*W*3) processed by the detail enhanced submodel constructed from the ResNet to obtain a high-quality output image.

Through the above processing, it is ensured that no information of the primary restored image sample is lost, and meanwhile, through the processing of the plurality of residual blocks, the data of each residual block has a same resolution, so that details of the image are restored and detailed processing of the data is improved, and that details of the primary restored image sample can be enhanced, and the restoration quality of the image sample is improved.

In some possible implementations, processing, according to the deep residual network, primary detail enhanced training samples in the primary detail enhanced training sample set to obtain the residual sample set may include: performing convolution and activation for N times on the residual samples in the primary detail enhanced training sample set to obtain a primary residual sample set, where N is an integer greater than or equal to 2; and summing primary residual samples in the primary residual sample set and the primary detail enhanced training samples in a corresponding primary detail enhanced training sample set, to obtain a residual sample set.

Through the above processing, the depth of the network can be increased without worrying about loss of the image information, and in turn, more information can be learned by expanding the depth of the network.

Figure 7:
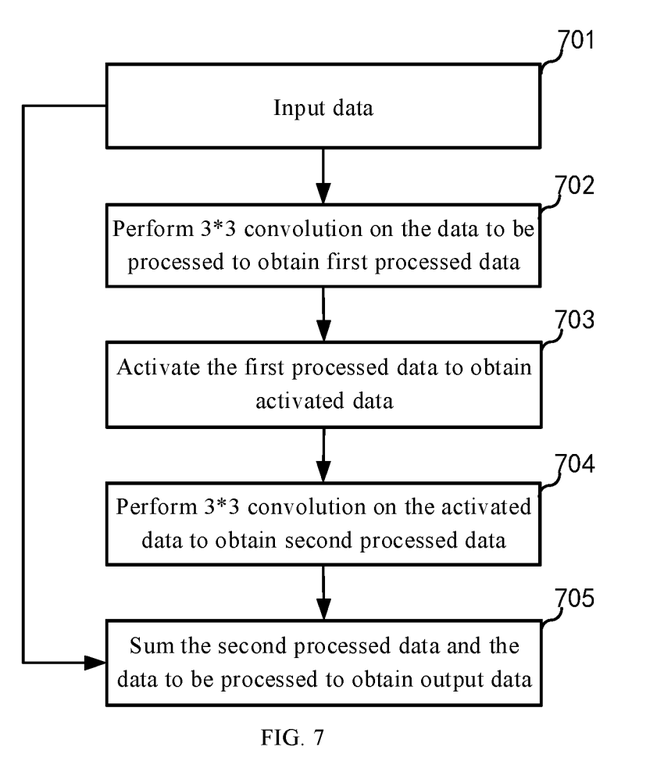
FIG. 7 is a flowchart of a method for processing residual samples in a residual sample set according to an embodiment of the present application.

FIG. 7 shows a flowchart of a method for processing residual samples in a residual sample set according to an embodiment of the present application. As shown in FIG. 7, the method may specifically include operations 701 to 705.

At operation 701, inputting data to be processed.

The data to be processed may be a certain residual sample in the primary detail enhanced training sample set.

At operation 702, performing 3*3 convolution on the data to be processed to obtain first processed data.

At operation 703, activating the first processed data to obtain activated data.

At operation 704, performing 3*3 convolution on the activated data to obtain second processed data.

At operation 705, summing the second processed data and the data to be processed to obtain output data.

Through the above processing, the depth of the network can be increased without losing information of the data to be processed; and by expanding the depth of the network, data information is increased, more information is learned, and detail enhancement of the image data is promoted.

In some possible implementations, operation 123 may include: comparing enhanced restored image samples in the enhanced restored image sample set with reference image samples in a corresponding preset reference image sample set one by one to obtain a correction parameter set; and determining, according to the correction parameter set, the weight coefficient of the image restoration model.

For example, the correction parameter set is obtained through some processing functions in the neural network, which may further include acquiring a training trend of the image restoration model through a contrast enhanced restored image sample and a reference image sample, and determining the correction parameter set according to the training trend, so that the weight coefficient of the image restoration model is determined by adjusting parameters in the correction parameter set, and the adjustment trend of the weight coefficient is ensured to be developed towards a convergence direction.

It should be noted that the obtaining manner of the correction parameter set described above is merely illustrative, and may be specifically set according to the specific implementation, and other obtaining manners of the correction parameter set that are not described herein also fall within the protection scope of the present application, which will not be described in detail here.

In some possible implementations, comparing enhanced restored image samples in the enhanced restored image sample set with reference image samples in the corresponding preset reference image sample set one by one to obtain the correction parameter set may include: determining a joint objective function according to a structural similarity function, the enhanced restored image sample set and the preset reference image sample set; and calculating, with the joint objective function, the enhanced restored image samples in the enhanced restored image sample set and the reference image samples in the preset reference image sample set corresponding to the enhanced restored image sample set, to obtain the correction parameter set.

The joint objective function may be expressed by: $L=\alpha L_{enh}+(1-\alpha)L_{ssim}$, where L represents a value of the joint objective function, $$L_{enh} = \frac{1}{mn}\sum_{i=0}^{m-1}\sum_{j=0}^{n-1}\|I'(I,j) - I_{GT}(I,j)\|,$$

where m represents a width of the image, n represents a height of the image, (I,j) represents coordinate values of a pixel point in a coordinate system constructed on the width and the height of the mage, I' represents the restored enhanced image sample, $I_{GT}$ represents the reference image sample, $L_{enh}$ represents a norm of an absolute value of a difference between the restored enhanced image sample I' and the reference image sample $I_{GT}$, $L_{ssim}$ represents a structural similarity function, and $L_{ssim}$ is specifically defined as $$L_{ssim} = 1 - \frac{1}{N}\sum_{p=0}^{N-1}\frac{(2\mu_x\mu_y+c_1)(2\sigma_{xy}+c_2)}{(\mu_x^2+\mu_y^2+c_1)(\sigma_x^2+\sigma_y^2+c_2)},$$

where x and y represent two image samples with different structures, $\mu_x$, $\mu_y$ represent mean values of x and y, respectively, $\sigma_x$, $\sigma_y$ represent variances of x and y, respectively, $\sigma_{xy}$ represents a covariance of x and y, α represents a weight coefficient of the image restoration model, and N represents a number of image blocks into which the image sample is divided.

The weight coefficient of the image restoration model is obtained through calculation with the joint objective function, and adjusted so that a value of the joint objective function, which tends to be converged compared with that of the last time, is obtained through calculation again. After multiple times of calculation and adjustment to the weight coefficient, the finally resulted image restoration model can meet the restoration requirement of the low-illumination image sample, that is, when a low-illumination image sample is input into the finally resulted image restoration model, an image infinitely close to the normal image sample obtained under normal illumination can be obtained.

Figure 8:
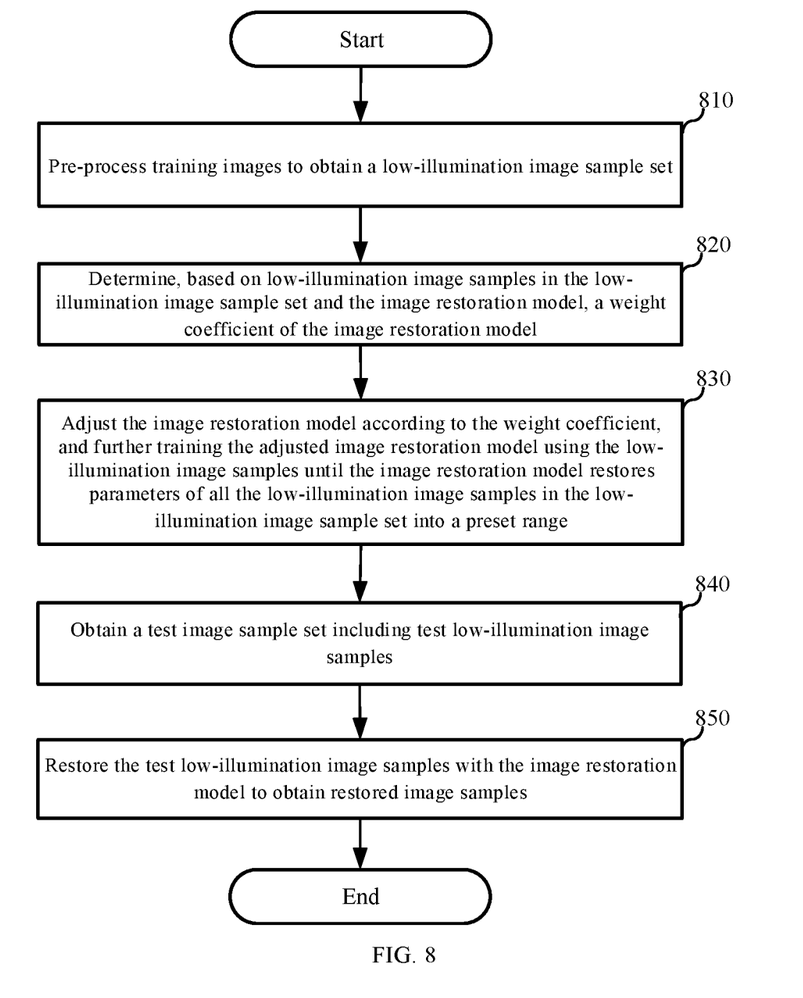
FIG. 8 is another schematic flowchart of a method for training an image restoration model according to an embodiment of the present application.

FIG. 8 shows another schematic flowchart of a method for training an image restoration model according to an embodiment of the present application. As shown in FIG. 8, the method for training an image restoration model may specifically include the following operations 810 to 850.

At operation 810, pre-processing training images to obtain a low-illumination image sample set.

At operation 820, determining, based on low-illumination image samples in the low-illumination image sample set and the image restoration model, a weight coefficient of the image restoration model.

At operation 830, adjusting the image restoration model according to the weight coefficient, and further training the adjusted image restoration model using the low-illumination image samples until the image restoration model restores parameters of all the low-illumination image samples in the low-illumination image sample set into a preset range.

It should be noted that operations 810 to 830 in this implementation are the same as operations 110 to 130, and are not repeated here.

At operation 840, obtaining a test image sample set.

The test image sample set may include test low-illumination image samples which are image samples obtained when the illumination is less than a preset illumination threshold, for example, image samples captured at night.

At operation 850, restoring the test low-illumination image samples with the image restoration model to obtain restored image samples.

Parameters in a performance parameter set of the restored image samples are superior to performance parameters of the test low-illumination image samples. The parameters in the performance parameter set include at least any one of an image contrast, an image brightness, an image resolution, or an image color rendition.

By restoring the test low-illumination image samples with the image restoration model, the training result of the image restoration model can be judged. If the image contrast, the image brightness, the image resolution or the color rendition of the obtained restored image sample is enhanced, it is determined that the currently obtained image restoration model can meet the requirements. Under an ideal condition, the restored image sample can be infinitely close to a normal image sample (for example, an image captured in daytime). Therefore, it is ensured to provide good image quality for a user and improve the user experience.

Figure 9:
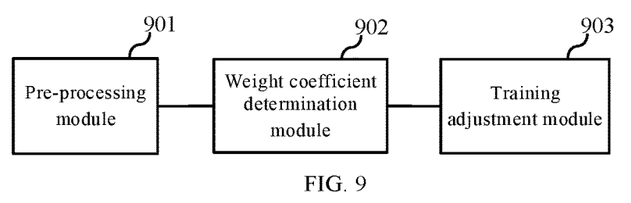
FIG. 9 is a block diagram of an apparatus for training an image restoration model according to an embodiment of the present application.

FIG. 9 is a block diagram of an apparatus for training an image restoration model according to an embodiment of the present application. For specific implementations of the apparatus, reference may be made to relevant description in the foregoing implementations, and repeated descriptions are omitted. It should be noted that the specific implementations of the apparatus provided in the embodiments of the present application are not limited to the above, and other embodiments not described herein also fall within the protection scope of the present apparatus.

As shown in FIG. 9, the apparatus for training an image restoration model may specifically include: a pre-processing module 901 configured to pre-process training images to obtain a low-illumination image sample set; a weight coefficient determination module 902 configured to determine, based on low-illumination image samples in the low-illumination image sample set and the image restoration model, a weight coefficient of the image restoration model, where the image restoration model is a neural network model determined from a U-Net network and a deep residual network; and a training adjustment module 903 configured to adjust the image restoration model according to the weight coefficient, and further train the adjusted image restoration model using the low-illumination image samples until the image restoration model restores parameters of all the low-illumination image samples in the low-illumination image sample set into a preset range.

According to the apparatus for training an image restoration model provided in the embodiment of the present application, the weight coefficient determination module 902 may determine, based on low-illumination image samples in the low-illumination image sample set and the image restoration model, a weight coefficient of the image restoration model; and the training adjustment module 903 may continuously adjust the weight coefficient of the image restoration model, until finally an image restoration model capable of restoring all the low-illumination image samples in the low-illumination image sample set to the preset image samples is obtained, where the image restoration model is a neural network model determined from a U-Net network and a deep residual network. Therefore, the influence of ambient light on video monitoring imaging can be reduced, the obtained low-illumination image can be improved and restored to obtain a normal image sample, thereby preventing the problem of image unsharpness and improving the user experience. In addition, no additional hardware equipment is desired, and the hardware cost is reduced.

It should be noted that all modules referred to in the embodiments of the present application are logic modules, and in practical applications, one logic unit may be one physical unit, or a part of one physical unit, or may be implemented by a combination of multiple physical units. Also, the present application is not limited to the specific configurations and processing described in the embodiments of the present application and shown in the drawings. A detailed description of known methods is omitted herein for convenience and brevity of description. In addition, for specific working processes of the systems, modules and units described above, reference may be made to the description of the method for training an image restoration model in the embodiments of the present application, and details will not be repeated here.

Figure 10:
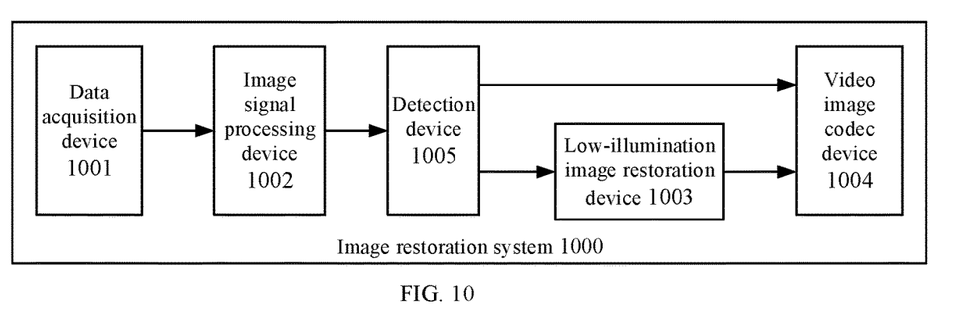
FIG. 10 is a block diagram of an image restoration system according to an embodiment of the present application.

FIG. 10 shows a block diagram of an image restoration system according to an embodiment of the present application. An image restoration system 1000 may specifically include: a data acquisition device 1001, an image signal processing device 1002, a low-illumination image restoration device 1003, a video image codec device 1004, and a detection device 1005.

The data acquisition device 1001 may be configured to acquire raw image data by a camera; the image signal processing device 1002 may be configured to perform image processing on the raw image data input from the data acquisition device 1001; the low-illumination image restoration device 1003 may be configured to construct a low-illumination image restoration model according to the method for training an image restoration model provided in the embodiments of the present application, and restore a low-illumination image with the low-illumination image restoration model; the video image codec device 1004 is configured to encode and decode an image; and the detection device 1005 is configured to detect an image output from the image signal processing device 1002, and judge whether the image is a low-illumination image.

In some possible implementations, after the raw image data is acquired by the camera, the data acquisition device 1001 may input the raw image data into the image signal processing device 1002 for a series of image processing, for example, removing noises in the raw image data, or dividing the raw image data or the like, to obtain a processed image, and output the processed image to the detection device 1005. The detection device 1005 detects the processed image, and, if it is detected that the obtained image sample is an image (e.g., a normal image) captured when the illumination is greater than or equal to a preset illumination threshold, directly inputs the image sample into the video image codec device 1004 for direct encoding and decoding, and outputs the image to a user for viewing; and if it is detected that the obtained image sample is an image (e.g., a low-illumination image) captured when the illumination is less than the preset illumination threshold, firstly outputs the image to the low-illumination image restoration device 1003, so that the low-illumination image restoration device 1003 restores the low-illumination image to obtain a restored high-illumination image which has parameters superior to those of the low-illumination image, and which ideally, is a normal image; and then inputs the high-illumination image into the video image codec device 1004 for encoding and decoding, and outputs the image to the user for viewing.

Through the above processing, video monitoring images of high quality can be provided for users no matter under sufficient illumination in daytime or under low illumination at night, thereby improving the user experience.

Figure 11:
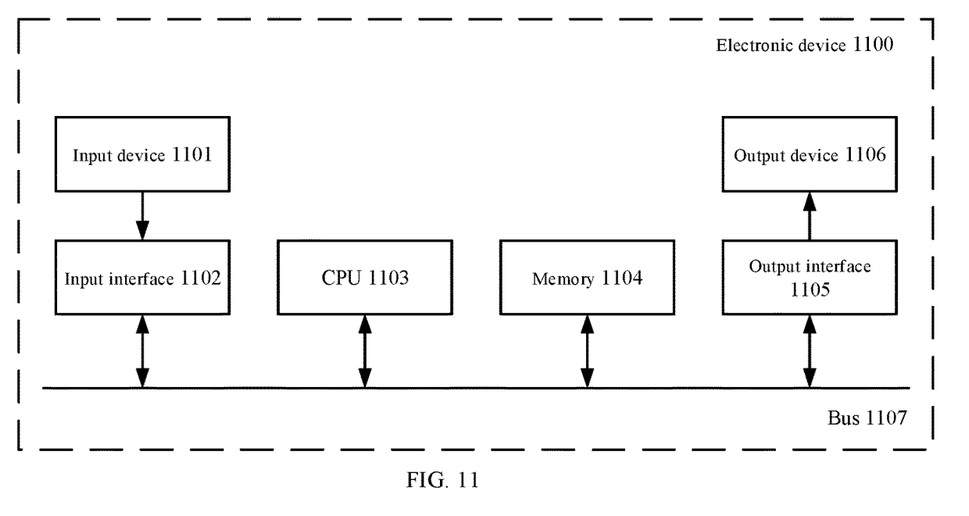
FIG. 11 is a schematic structural diagram of exemplary hardware architecture of an electronic device according to an embodiment of the present application.

FIG. 11 is a schematic structural diagram of exemplary hardware architecture of an electronic device according to an embodiment of the present application. The electronic device may implement the method for training an image restoration model provided in any embodiment of the present application.

As shown in FIG. 11, the electronic device 1100 may include an input device 1101, an input interface 1102, a central processing unit 1103, a memory 1104, an output interface 1105, and an output device 1106. The input interface 1102, the central processing unit 1103, the memory 1104, and the output interface 1105 are connected to each other via a bus 1107, and the input device 1101 and the output device 1106 are connected to the bus 1107 via the input interface 1102 and the output interface 1105, respectively, and further connected to other components of the electronic device 1100.

In some possible implementations, the input device 1101 may receive input information from the outside and transmit the input information to the central processing unit 1103 through the input interface 1102; the central processing unit 1103 processes the input information based on computer-executable instructions stored in the memory 1104 to generate output information, stores the output information temporarily or permanently in the memory 1104, and then transmits the output information to the output device 1106 through the output interface 1105; and the output device 1106 outputs output information outside of the computing device 1100 for use by a user.

In some possible implementations, the electronic device 1100 shown in FIG. 11 may be implemented by an electronic device that may include: a memory configured to store a program; and a processor configured to execute the program stored on the memory to implement the method for training an image restoration model according to any embodiment of the present application.

According to the embodiments of the present application, the process described in the above reference flowchart may be implemented as a computer software program. For example, an embodiment of the present application further provides a computer program product including a computer program tangibly embodied on a machine-readable medium. The computer program contains program codes to execute the method shown in the flowchart. In some possible implementations, the computer program may be downloaded and installed from a network, and/or installed from a removable storage medium.

Those of ordinary skill in the art will appreciate that all or some operations of the above described method, functional modules/units in the system and apparatus may be implemented as software, firmware, hardware, and suitable combinations thereof. In a hardware implementation, the division between the functional modules/units mentioned in the above description does not necessarily correspond to the division of physical components; for example, one physical component may have multiple functions, or one function or operation may be performed cooperatively by several physical components. Some or all physical components may be implemented as software executed by a processor, such as a CPU, a digital signal processor or microprocessor, or implemented as hardware, or implemented as an integrated circuit, such as an application specific integrated circuit. Such software may be distributed on a computer-readable medium which may include a computer storage medium (or non-transitory medium) and communication medium (or transitory medium). As is well known to those of ordinary skill in the art, the term computer storage medium includes volatile and nonvolatile, removable and non-removable medium implemented in any method or technology for storing information, such as computer-readable instructions, data structures, program modules or other data. A computer storage medium includes, but is not limited to, RAM, ROM, EEPROM, flash memory or other memory technology, CD-ROM, digital versatile disc (DVD) or other optical disc storage, magnetic cartridge, magnetic tape, magnetic disk storage or other magnetic storage devices, or may be any other medium used for storing the desired information and accessible by a computer. Moreover, it is well known to those ordinary skilled in the art that a communication medium typically includes a computer-readable instruction, a data structure, a program module, or other data in a modulated data signal, such as a carrier wave or other transport mechanism, and may include any information delivery medium.

The present disclosure has disclosed example embodiments, and although specific terms are employed, they are used and should be interpreted merely in a generic and descriptive sense, not for purposes of limitation. In some instances, as would be apparent to one skilled in the art, features, characteristics and/or elements described in connection with a particular embodiment may be used alone or in combination with features, characteristics and/or elements described in connection with another embodiment, unless expressly stated otherwise. It will, therefore, be understood by those skilled in the art that various changes in form and details may be made therein without departing from the scope of the present application as set forth in the appended claims.

What is claimed is:

1. A method for training an image restoration model, comprising:
   pre-processing training images to obtain a low-illumination image sample set;
   determining, based on low-illumination image samples in the low-illumination image sample set and the image restoration model, a weight coefficient of the image restoration model, wherein the image restoration model is a neural network model determined from a U-Net network and a deep residual network; and
   adjusting the image restoration model according to the weight coefficient, and further training the adjusted image restoration model using the low-illumination image samples until the image restoration model restores parameters of all the low-illumination image samples in the low-illumination image sample set into a preset range,
   wherein the determining, based on low-illumination image samples in the low-illumination image sample set and the image restoration model, the weight coefficient of the image restoration model, comprises:
      performing, according to the U-Net network, lossless data reorganization and data characteristic fusion on the low-illumination image samples in the low-illumination image sample set to obtain a primary restored image sample set;
      inputting primary restored image samples in the primary restored image sample set into a detail enhanced submodel in the image restoration model for training to obtain an enhanced restored image sample set, wherein the detail enhanced submodel is a neural network model determined from the deep residual network; and
      determining, according to the enhanced restored image sample set and a preset reference image sample set, the weight coefficient of the image restoration model;
   wherein the inputting primary restored image samples in the primary restored image sample set into the detail enhanced submodel in the image restoration model for training to obtain the enhanced restored image sample set, comprises:
      performing lossless down-sampling and data reorganization on the primary restored image samples to obtain a primary detail enhanced training sample set;
      processing, according to the deep residual network, primary detail enhanced training samples in the primary detail enhanced training sample set to obtain a residual sample set; and
      performing up-sampling and data reorganization on residual samples in the residual sample set to obtain the enhanced restored image sample set, and
   wherein the performing up-sampling and data reorganization on residual samples in the residual sample set to obtain the enhanced restored image sample set, comprises:
      performing convolution and activation for N times on the residual samples in the primary detail enhanced training sample set to obtain a primary residual sample set, where N is an integer greater than or equal to 2; and
      summing primary residual samples in the primary residual sample set and the primary detail enhanced training samples in a corresponding primary detail enhanced training sample set, to obtain the residual sample set.

2. The method according to claim 1, wherein the determining, according to the enhanced restored image sample set and the preset reference image sample set, the weight coefficient of the image restoration model, comprises:
   comparing enhanced restored image samples in the enhanced restored image sample set with reference image samples in a corresponding preset reference image sample set one by one to obtain a correction parameter set; and
   determining, according to the correction parameter set, the weight coefficient of the image restoration model.

3. The method according to claim 2, wherein the comparing enhanced restored image samples in the enhanced restored image sample set with reference image samples in the corresponding preset reference image sample set one by one to obtain the correction parameter set, comprises:
   determining a joint objective function according to a structural similarity function, the enhanced restored image sample set and the preset reference image sample set; and
   calculating, with the joint objective function, the enhanced restored image samples in the enhanced restored image sample set and the reference image samples in the preset reference image sample set corresponding to the enhanced restored image sample set, to obtain the correction parameter set.

4. The method according to claim 1, wherein the pre-processing training images to obtain the low-illumination image sample set, comprises:
   normalizing the training images to obtain normalized image data;
   sampling in row and column directions of the normalized image data in an alternative manner, respectively, to obtain M pieces of dimensional data, where M is an integer greater than or equal to 1; and performing data augmentation on each piece of dimensional data to obtain the low-illumination image sample set and a preset reference image sample set.

5. The method according to claim 1, wherein after the image restoration model restores parameters of all the low-illumination image samples in the low-illumination image sample set into the preset range, the method further comprises:

acquiring a test image sample set, the test image sample set comprising test low-illumination image samples; and restoring the test low-illumination image samples with the image restoration model to obtain restored image samples, wherein parameters in a performance parameter set of the restored image samples are superior to performance parameters of the test low-illumination image samples.

6. The method according to claim 5, wherein the parameters in the performance parameter set comprise at least any one of an image contrast, an image brightness, an image resolution, or an image color rendition.

7. The method according to claim 1, wherein the low-illumination image samples in the low-illumination image sample set are image samples obtained when a detected illumination is less than a preset illumination threshold, and reference image samples in the preset reference image sample set are image samples obtained when the detected illumination is greater than or equal to the preset illumination threshold.

8. The method according to claim 1, wherein a color mode of the training images is an RGB mode.

9. An apparatus for training an image restoration model, comprising:

a pre-processor configured to pre-process training images to obtain a low-illumination image sample set;

a weight coefficient calculator configured to determine, based on low-illumination image samples in the low-illumination image sample set and the image restoration model, a weight coefficient of the image restoration model, wherein the image restoration model is a neural network model determined from a U-Net network and a deep residual network; and a training-adjuster configured to adjust the image restoration model according to the weight coefficient, and further train the adjusted image restoration model using the low-illumination image samples until the image restoration model restores parameters of all the low-illumination image samples in the low-illumination image sample set into a preset range, wherein the weight coefficient calculator is further configured to:

perform, according to the U-Net network, lossless data reorganization and data characteristic fusion on the low-illumination image samples in the low-illumination image sample set to obtain a primary restored image sample set;

input primary restored image samples in the primary restored image sample set into a detail enhanced submodel in the image restoration model for training to obtain an enhanced restored image sample set, wherein the detail enhanced submodel is a neural network model determined from the deep residual network; and determine, according to the enhanced restored image sample set and a preset reference image sample set, the weight coefficient of the image restoration model, and the weight coefficient calculator is further configured to:

perform convolution and activation for N times on the residual samples in the primary detail enhanced training sample set to obtain a primary residual sample set, where N is an integer greater than or equal to 2; and sum primary residual samples in the primary residual sample set and the primary detail enhanced training samples in a corresponding primary detail enhanced training sample set, to obtain the residual sample set.

10. An electronic device, comprising:

one or more processors; and a storage device having one or more programs stored thereon which, when executed by the one or more processors, cause the one or more processors to implement the method according to claim 1.

11. A non-transitory computer-readable storage medium having a computer program stored thereon which, when executed by a processor, causes the method according to claim 1 to be implemented.

12. The method according to claim 1, wherein the pre-processing training images to obtain the low-illumination image sample set, comprises:

normalizing the training images to obtain normalized image data;

sampling in row and column directions of the normalized image data in an alternative manner, respectively, to obtain M pieces of dimensional data, where M is an integer greater than or equal to 1; and performing data augmentation on each piece of dimensional data to obtain the low-illumination image sample set and the preset reference image sample set.

13. The method according to claim 2, wherein the pre-processing training images to obtain the low-illumination image sample set, comprises:

normalizing the training images to obtain normalized image data;

sampling in row and column directions of the normalized image data in an alternative manner, respectively, to obtain M pieces of dimensional data, where M is an integer greater than or equal to 1; and performing data augmentation on each piece of dimensional data to obtain the low-illumination image sample set and the preset reference image sample set.

14. The method according to claim 3, wherein the pre-processing training images to obtain the low-illumination image sample set, comprises:

normalizing the training images to obtain normalized image data;

sampling in row and column directions of the normalized image data in an alternative manner, respectively, to obtain M pieces of dimensional data, where M is an integer greater than or equal to 1; and performing data augmentation on each piece of dimensional data to obtain the low-illumination image sample set and the preset reference image sample set.

15. The method according to claim 1, wherein the pre-processing training images to obtain the low-illumination image sample set, comprises:

normalizing the training images to obtain normalized image data;

sampling in row and column directions of the normalized image data in an alternative manner, respectively, to obtain M pieces of dimensional data, where M is an integer greater than or equal to 1; and performing data augmentation on each piece of dimensional data to obtain the low-illumination image sample set and the preset reference image sample set.

16. The method according to claim 1, wherein the pre-processing training images to obtain the low-illumination image sample set, comprises:

normalizing the training images to obtain normalized image data;

sampling in row and column directions of the normalized image data in an alternative manner, respectively, to obtain M pieces of dimensional data, where M is an integer greater than or equal to 1; and performing data augmentation on each piece of dimensional data to obtain the low-illumination image sample set and the preset reference image sample set.

17. The method according to claim 1, wherein after the image restoration model restores parameters of all the low-illumination image samples in the low-illumination image sample set into the preset range, the method further comprises:

acquiring a test image sample set, the test image sample set comprising test low-illumination image samples; and restoring the test low-illumination image samples with the image restoration model to obtain restored image samples, wherein parameters in a performance parameter set of the restored image samples are superior to performance parameters of the test low-illumination image samples.

* * * * *